United States Patent
Miyaoka (10) Patent No.: US 7,466,638 B2
(45) Date of Patent: Dec. 16, 2008

(54) OPTICAL DISK RECORDING POWER ADJUSTMENT METHOD AND OPTICAL DISK APPARATUS ADAPTED TO OPERATE WITH THE SAME

(75) Inventor: Yasuyuki Miyaoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/760,462

(22) Filed: Jun. 8, 2007

(65) Prior Publication Data
US 2008/0008064 A1    Jan. 10, 2008

(30) Foreign Application Priority Data
Jul. 10, 2006    (JP) .............................. 2006-189153

(51) Int. Cl.
*G11B 7/00* (2006.01)
(52) U.S. Cl. .................................. 369/47.53
(58) Field of Classification Search ........................ None
See application file for complete search history.

(56) References Cited

U.S. PATENT DOCUMENTS

| | | | |
|---|---|---|---|
| 5,091,897 A | 2/1992 | Otokawa et al. | 369/13 |
| 5,233,578 A | 8/1993 | Yamamoto et al. | 369/13 |
| 5,274,622 A * | 12/1993 | Kono | 369/116 |
| 5,398,227 A | 3/1995 | Miyaoka et al. | 369/116 |
| 5,732,055 A * | 3/1998 | Masaki et al. | 369/53.26 |
| 5,953,289 A | 9/1999 | Miyaoka | 369/13 |
| 6,058,077 A | 5/2000 | Miyaoka | 369/13 |
| 6,069,852 A | 5/2000 | Miyaoka et al. | 369/13 |
| 6,246,641 B1 | 6/2001 | Miyaoka | 369/13 |
| 6,249,489 B1 | 6/2001 | Fujii et al. | 369/13 |
| 6,249,490 B1 | 6/2001 | Miyaoka | 369/13 |
| 6,314,061 B1 | 11/2001 | Miyaoka | 369/13 |
| 6,343,052 B1 | 1/2002 | Hashimoto et al. | 369/13 |
| 6,639,890 B1 * | 10/2003 | Miura et al. | 369/116 |

(Continued)

FOREIGN PATENT DOCUMENTS

JP    2001-184650    7/2001

(Continued)

OTHER PUBLICATIONS

European Communication and Search Report dated Jan. 2, 2008, regarding Application No. 07110624.9—1232.

*Primary Examiner*—Peter Vincent Agustin
(74) *Attorney, Agent, or Firm*—Fitzpatrick, Cella, Harper & Scinto (57) ABSTRACT

A recording power row P(i) is selected and a signal is recorded in a recording test region of an optical disk, while shifting a recording power, to detect a reproduced signal amplitude row m(i) that corresponds to the recording power row P(i). The relation of the recording power row P(i) and the row of multiplication products P(i)×m(i) is linearly approximated and the intersection of the linear approximation straight line and the recording power axis is computationally determined as recording threshold power $P_{thr}$, for at least three recording power rows $P_f(i)$ that are centered at $P_f(j)$ in the recording power row P(i) within a defined range. Then, the recording power $P_t(j)$ is computed as a multiplication product of the recording threshold power $P_{thr}(j)$ and a factor κ contained in the disk information, for each recording power row $P_f(i)$. Finally, the optimum recording power $P_{wopt}$ is computationally determined according to the at least three recording powers $P_t(j)$.

2 Claims, 8 Drawing Sheets

U.S. PATENT DOCUMENTS

| | | | |
|---|---|---|---|
| 6,646,968 B1 | 11/2003 | Miyaoka | 369/53.31 |
| 6,716,489 B2 | 4/2004 | Miyaoka | 427/548 |
| 7,136,328 B2 | 11/2006 | Miyaoka | 369/13.27 |
| 7,165,263 B2 | 1/2007 | Miyaoka | 720/718 |
| 7,289,408 B2 | 10/2007 | Miyaoka | 369/53.31 |
| 2005/0207299 A1 | 9/2005 | Yamaguchi et al. | 369/47.53 |
| 2007/0097809 A1 | 5/2007 | Miyaoka | 369/44.23 |

FOREIGN PATENT DOCUMENTS

| | | |
|---|---|---|
| JP | 2003-248932 | 9/2003 |
| JP | 2005-267802 | 9/2005 |
| WO | WO 2006/067737 A1 | 6/2006 |

* cited by examiner

OPTICAL DISK RECORDING POWER ADJUSTMENT METHOD AND OPTICAL DISK APPARATUS ADAPTED TO OPERATE WITH THE SAME

BACKGROUND OF THE INVENTION

1. Field of the Invention

This invention relates to a method of adjusting the recording power for recording information on an optical disk and also to an optical disk apparatus adapted to operate with such a method. More particularly, the present invention relates to a method of adjusting the recording power for an optical disk, utilizing the information written on the optical disk.

2. Description of the Related Art

To date, optimum recording power varies from optical disk to optical disk due to differences of characteristics of optical disks among manufacturers and variances of characteristics of individual optical disks. Additionally, optimum recording power depends not only on the characteristics of each optical disk but also on the timing of emission of a light beam (recording strategy), the contour of the spot of the emitted light beam and other characteristics of each optical disk apparatus. Still additionally, it is necessary to take the calibration error of recording power among optical disk apparatus into consideration.

For these reasons, an optical disk apparatus for recording data on optical disks is configured to detect the optimum recording power for each optical disk by so-called test recording in order to determine the optimum recording power of the optical disk in advance of an actual data recording operation and subsequently execute the actual writing process, using the optimum recording power.

A series of operations for detecting the optimum recording power by test recording is referred to as OPC (optimum power control).

Now, the OPC operation will be described below. Each optical disk apparatus acquires the data required for defining the optimum recording power for an optical disk from the disk information region of the optical disk arranged at the innermost track part of the disk and performs a test recording operation of writing a predetermined pattern in a recording test region.

Generally, a random pattern where marks ranging from the shortest mark to the longest mark are randomly repeated according to a modulation rule relative to the clock period T of the modulation rule is used as recording pattern for test recording. Then, the optical disk apparatus defines the recording pattern by referring to the reference recording power $P_{target}$ that is included in the data required for defining the recording power as acquired in advance from the disk information region. In other words, the optical disk apparatus sequentially switches the recording power stepwise within a predetermined range that is centered at the reference recording power $P_{target}$ and records the random pattern.

Figure 9:
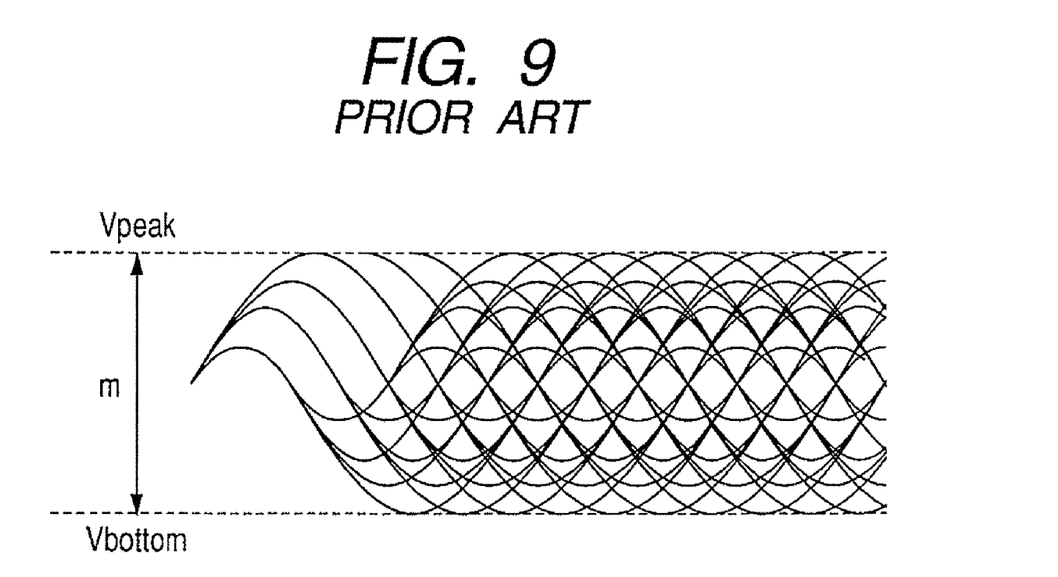
FIG. 9 is a schematic illustration of observation of reproduced signal amplitude.

After recording the random pattern, sequentially switching the recording power in the above-described manner, the optical disk apparatus reproduces the random pattern and observes the signal amplitude m for each recording power. The signal amplitude m is expressed as the difference between the highest level and the lowest level of reproduction of the signal recorded to correspond to each recording power as shown in FIG. 9 of the accompanying drawings. Generally, the amplitude value m is determined by detecting the peak and the bottom of the reproduced signal amplitude.

Then, the signal amplitude m is observed for each recording power and the product of multiplication of each recording power P and the corresponding signal amplitude m, or P×m, is used as evaluation value. This method (to be referred to as κ method hereinafter) has the advantage that the accuracy level can be expectedly improved by using linear approximation.

Figure 10:
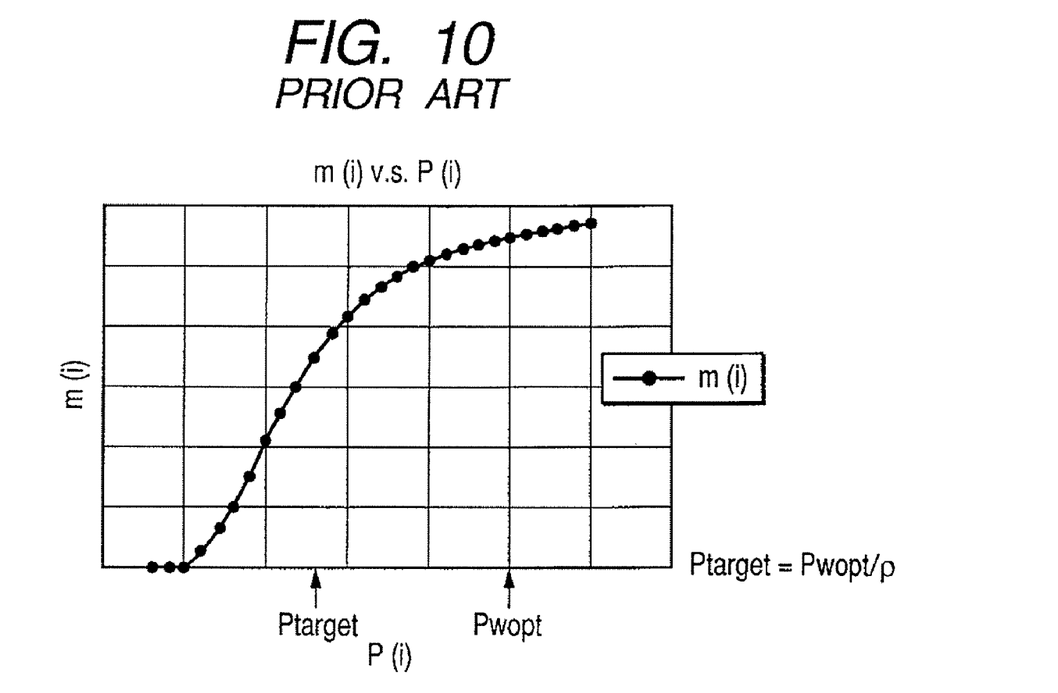
FIG. 10 is a graph illustrating the recording power dependency of reproduced signal amplitude.
Figure 11:
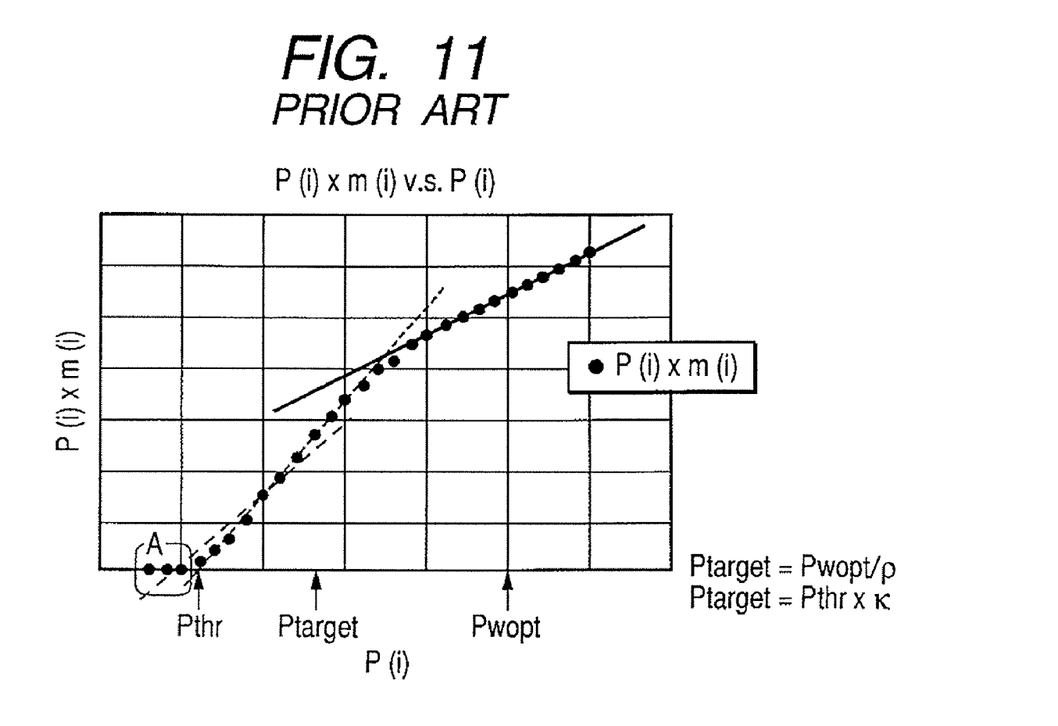
FIG. 11 is a graph illustrating the relationship between recording power P and evaluation value P×m.

Now, the κ method will be described below. FIG. 10 of the accompanying drawings is a typically characteristic curve, illustrating the relationship between the recording power P and the signal amplitude m. The signal amplitude m is approximated by formula (1) shown below as a function of the recording power P, $$m = M_{max} \times (1 - P_{thr}/P) \quad (1),$$

where $P_{thr}$ is the smallest necessary power (recording threshold power) and $M_{max}$ is the largest value (saturation value) of the signal amplitude to be recorded. Formula (2) is obtained by multiplying the two sides by P. The relationship between the evaluation value P×m of the left side can be approximated by a straight line as shown in FIG. 11 of the accompanying drawings. Note that $P_{thr}$ corresponds to the P intercept of the approximation straight line in FIG. 11.

$$P \times m = M_{max} \times (1 - P_{thr}) \quad (2)$$

FIG. 11 illustrates a typical relationship between the recording power P and the evaluation value P×m. As shown in FIG. 10, the change in the signal amplitude relative to the change in the recording power is reduced as the recording power rises. In other words, the sensitivity to changes of amplitude falls. It is desirable for an OPC operation that the sensitivity is high from the viewpoint of accuracy of observation. Therefore, a predetermined factor ρ is introduced for the optimum recording power $P_{wopt}$ to be used for actual recording. Thus, the recording power $P_{target}$ for OPC is defined as $P_{target} = P_{wopt}/\rho$, and the recording power is recommended to be used as reference for OPC. In other words, the value of $P_{target}$ is recorded in the disk information region of the optical disk. The ratio of $P_{target}$ and $P_{thr}$ is defined as $$\kappa = P_{target}/P_{thr}$$

and the value of κ is also recorded in the disk information region of the optical disk.

When $P_{target}$, ρ and κ are given as disk information, an OPC operation is conducted by following the following sequence.

A test recording process is executed in the OPC region (recording test region) of the disk by using a predetermined random pattern, changing the recording power at and near $P_{target}$ within a range of $P_{target} \pm 10\%$, for instance. Then, the signal amplitude m corresponding to each recording power P is observed and the evaluation value P×m is computed.

Then, the relationship between P and P×m is linearly approximated and $P_{thr}$ is determined from the intersection of the power axis and the approximation straight line (P intercept). The determined $P_{thr}$ is multiplied by κ to determine $P_t$ ($P_t = P_{thr} \times \kappa$) and $P_t$ is multiplied by ρ to determine $P_{wopt}$ ($P_{wopt} = P_t \times \rho$). Note that $P_t$ is a redefinition of $P_{target}$ by OPC. If the state of the disk and the state of the apparatus are the same as those when the value of $P_{target}$ recorded in the disk information region of the disk was obtained, the value of $P_t$ and the value of $P_{target}$ should agree with each other.

A method of determining the relation of the evaluation value P×m and the recording power P within two observation ranges located near $P_{target}$, e.g., one centered at a point slightly shifted to the lower power side and the other centered at a point slightly shifted to the higher power side from $P_{target}$, and executing a predetermined computational process to improve the accuracy level of observation is also known.

With this method, $P_f1$ that is slightly shifted from $P_{target}$ to the lower power side for one of the centers of power and $P_f2$ that is slightly shifted from $P_{target}$ to the higher power side for the other center of power are defined. Then, also $P_t1$ and $P_t2$ are defined for the respective power centers as values obtained by determining the recording threshold powers $P_{thr}1$ and $P_{thr}2$ as the P intercepts from the relation (2) and multiplying them by a predetermined factor κ.

Then, $P_f$ and $P_t$ are taken respectively on the x-axis and on the y-axis and the x-coordinate (=y-coordinate) of the intersection of the straight line A connecting point ($P_f1$, $P_t1$) and point ($P_f2$, $P_t2$) and the straight line B of $P_t=P_f$ is defined as $P_t'$ and $P_t'$ is multiplied by ρ to determine the optimum recording power $P_{wopt}$ (Japanese Patent Application Laid-Open No. 2005-267802).

However, the recording power that is used for test recording by OPC can show a large discrepancy from a suitable power value depending on the characteristics of the recording film of the optical disk, the optical characteristics of the optical disk apparatus and the changes with time of the optical system such as those produced by stains.

Then, $P_f1$ and $P_f2$ of the recording powers as the power centers to be used by the apparatus for test recording can be shifted significantly from the values suited for OPC. Accordingly, the values observed at the two points of $P_f1$ and $P_f2$ can differ from the corresponding values contained in the information stored on the optical disk to a large extent.

Particularly, when the linearity of the evaluation value P×m of the optical disk is dependent on the recording power to be used for the observation to a large extent as shown in FIG. 11, the inclination of the approximation straight line can be modified significantly. Then, as a result, $P_{thr}$ and $P_t$ can be deviated greatly and the optimum recording power $P_{wopt}$ computed from them can be deviated accordingly so that it may no longer be possible to correctly define the optimum recording power $P_{wopt}$.

As an example, the outcome of an experiment where an optical disk apparatus was driven to operate for test recording under a condition where the desired recording power is not obtained on the recording film of an optical disk because of the stains of the optical system will be described below by referring to FIG. 12 of the accompanying drawings. $P_t1$ and $P_t2$ in FIG. 12 are obtained as a result of the test recording.

The power center slightly shifted from $P_{target}$ to the lower power side is defined as $P_f1$ and the power center slightly shifted from $P_{target}$ to the higher power side is defined as $P_f2$ as in the case of the above description of the prior art. The recording threshold powers $P_{thr}1$ and $P_{thr}2$ computed from the relation (2) for the respective power centers are multiplied by a predetermined factor κ to determine $P_t1$ and $P_t2$.

Figure 12:
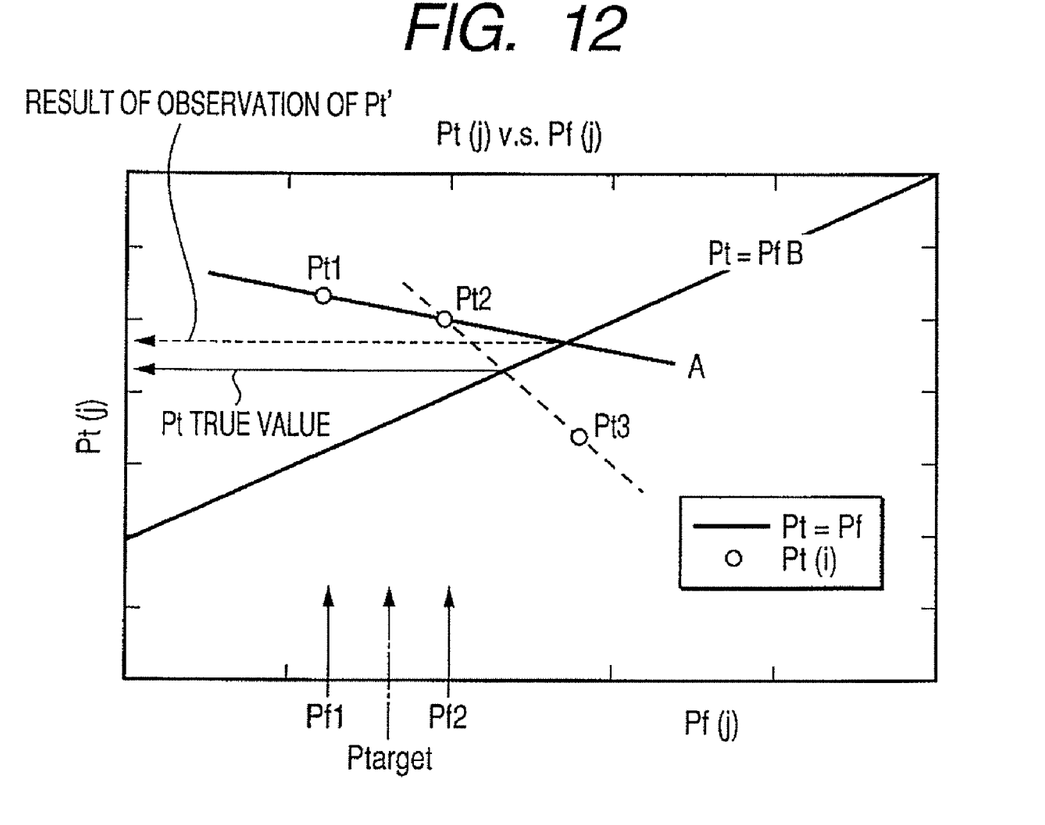
FIG. 12 is a graph illustrating the relationship between recording test center power $P_f$ and $P_t$.

Ideally, it is desirable that $P_t1$ and $P_t2$ are found at the opposite sides of the straight line expressed by $P_t=P_f$ like $P_t2$ and $P_t3$ illustrated in FIG. 12. In such a case, the error that arises when determining $P_t'$ will be alleviated.

However, in FIG. 12, the power of irradiation on the optical disk is reduced so that consequently $P_t1$ and $P_t2$ that are determined respectively from $P_f1$ and $P_f2$ are deviated and moved away from the straight line of $P_t=P_f$ representing the ideal cases. With the conventional method, the intersection of the straight line A connecting $P_t1$ and $P_t2$ and the straight line B of $P_t=P_f$ is obtained as wanted $P_t'$. Then, $P_t'$ is multiplied by a predetermined factor ρ to determine the optimum recording power $P_{wopt}$.

However, since the range of recording power when the optical disk is operated for OPC is deviated from the desired range to a large extent, the position of point ($P_f1$, $P_t1$) and the position of point ($P_f2$, $P_t2$) are shifted greatly from the straight line $P_t=P_f$. Thus, it is no longer possible to properly determine $P_t'$ by way of the process using the two points. The net result is a deviated optimum recording power $P_{wopt}$.

Generally speaking, the recording power for recording information on an optical disk is lowered from the desired recording power level when the recording power is changed by degradation of the optical performance and stains of the optical system. Thus, there can arise an instance where nothing is recorded by the recording power for test recording as indicated by A in FIG. 11. In such an instance, the linearity of the evaluation value (P×m) gives way and hence the outcome obtained by linear approximation, using the observation points, is also deviated to a large extent.

On the other hand, when the test recording operation is repeated until the requirement of $P_f1<P_t<P_f2$ is met, long time is consumed for the test recording and for the reproduction of the recorded signal. Such an optical disk apparatus is inevitably a slow start apparatus that takes time until the optical disk apparatus become ready for operation.

SUMMARY OF THE INVENTION

In view of the above-identified circumstances, it is therefore the object of the present invention to provide a recording power adjustment method that can reliably optimize the power level of the recording power and an optical disk apparatus configured to operate with such a method.

According to the present invention, there is provided a recording power adjustment method for recording information on an optical disk comprising the steps of: selecting at least three testing center recording powers $P_f(j:j \geq 3)$ according to disk information written on the optical disk in advance; recording a signal in a recording test region of the optical disk, with a recording power being shifted according to a testing recording power row $P_j(i)$ defined around each of the testing center recording powers $P_f(j)$; reproducing the signal recorded in the recording test region and detecting a reproduced signal amplitude row $m_j(i)$ corresponding to the recording power row $P_j(i)$, for each of the testing center recording powers; linearly approximating a relationship between the recording power row $P_j(i)$ and the row of multiplication products of corresponding values of the reproduced signal amplitude row $m_j(i)$ and the recording power row $P_j(i)$ and computationally determining a recording threshold power $P_{thr}(j)$ as an intersection of the linear approximation straight line and the recording power axis, for each of the testing center recording powers; computationally determining a tentative reference recording power $P_t(j)$ as a multiplication product of the recording threshold power $P_{thr}(j)$ and a first factor κ contained in the disk information, for each of the testing center recording powers; computationally determining a definitive reference recording power $P_t'$ as an intersection of a straight line or curve connecting two points of ($P_f(j)$, $P_t(j)$) and a straight line representing $P_t=P_f$ in a graph in which the computationally determined at least three tentative reference recording powers $P_t(j)$ are plotted relative to the corresponding at least three testing center recording powers $P_f(j)$, the two points being selected such that the two points are located at the opposite sides of the straight line representing $P_t=P_f$; and computationally determining an optimum recording power $P_{wopt}$ to be used for recording on the optical disk by multiplying the definitive reference recording power $P_t'$ by a second factor ρ contained in the disk information.

Further features of the present invention will become apparent from the following description of exemplary embodiments with reference to the attached drawings.

DESCRIPTION OF THE PREFERRED EMBODIMENTS

Now, the present invention will be described in greater detail by referring to the accompanying drawings that illustrate preferred embodiments of the invention.

First Embodiment

Figure 2:
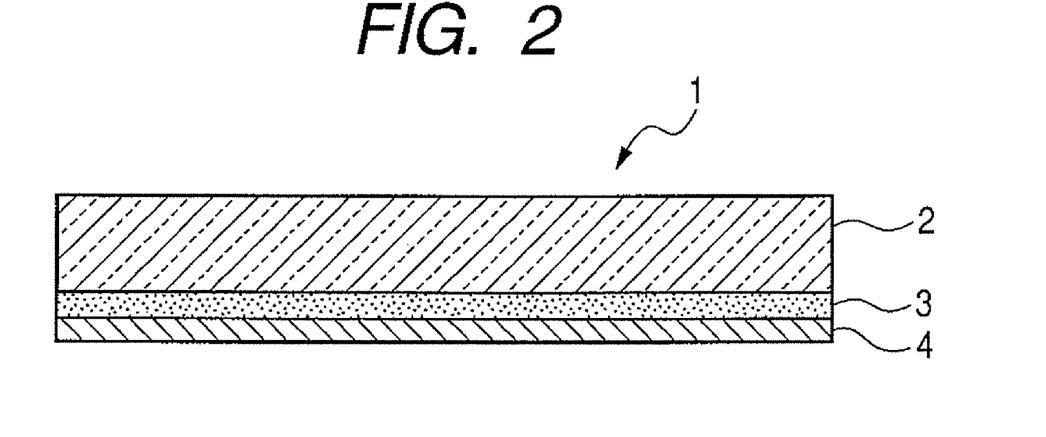
FIG. 2 is a schematic cross-sectional view of an optical disk that can be used for the purpose of the present invention.

FIG. 2 is a schematic cross-sectional view of an optical disk that can be used for the purpose of the present invention. The optical disk 1 includes a substrate 2 that is made of polycarbonate and an information recording layer 3 that is formed on the substrate 2 and includes a phase change recording film. When the optical disk 1 is a read-only disk, the phase change recording film of the information recording layer 3 is replaced by a reflection film.

A cover layer (light transmission layer) 4 having a thickness of t is formed on the information recording layer 3. The cover layer 4 is made of a plastic material and shows a thickness of t. The cover layer 4 is formed on the information recording layer 3 on the substrate 2 as a sheet of adhesive resin or ultraviolet setting resin by spin coating.

Figure 3:
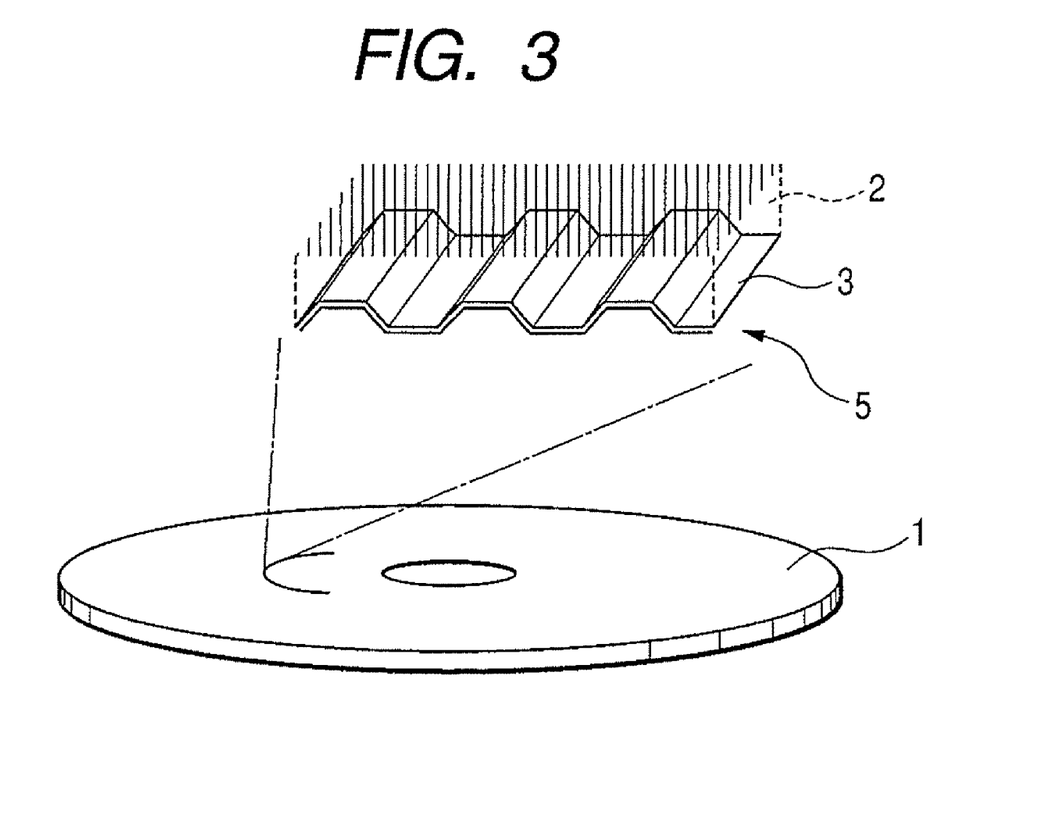
FIG. 3 is an enlarged schematic perspective view of some of the information recording tracks of an optical disk.

FIG. 3 is an enlarged schematic perspective view of some of the information recording tracks of an optical disk 1. A helical information recording track is or coaxial information recording tracks are formed in the information recording layer 3 of the optical disk 1. The information recording track is or tracks are formed by means of a guide groove that provides physical undulations and information is recorded on the recessed parts or the protruding parts or both as marks produced by phase changes. When the optical disk 1 is a read-only disk, the information recording track 5 is or tracks 5 are preformed as array of pre-pits.

Figure 1:
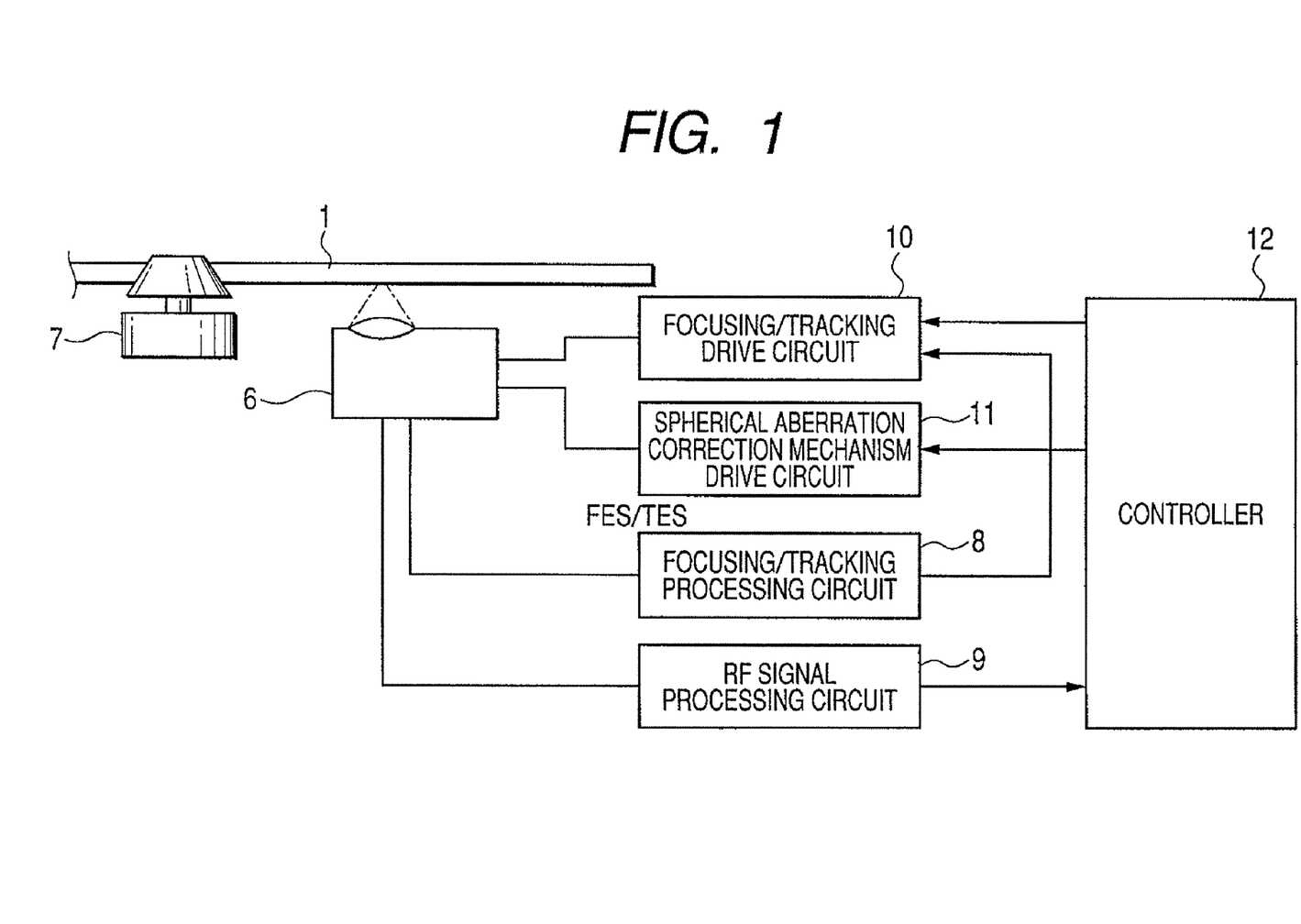
FIG. 1 is a schematic block diagram of an optical disk apparatus according to the present invention, illustrating the configuration thereof.

FIG. 1 is a schematic block diagram of an optical disk apparatus according to the present invention, illustrating the configuration thereof. An optical disk 1 that is an optical recording medium is driven to rotate by a spindle motor 7 and information is recorded or reproduced as a light beam is irradiated onto the optical disk 1 from an optical pickup 6.

In a recording or reproduction operation, the optical pickup 6 irradiates a light beam onto the optical disk 1. Then, the optical pickup 6 receives the light beam reflected by the optical disk 1 and converts the reflected light beam into an electric signal, and the electric signal is supplied to focusing/tracking processing circuit 8 and RF signal processing circuit 9.

The optical pickup 6 is formed from a semiconductor laser, a collimator lens, a beam splitter, a quarter-wave plate and a spherical aberration correcting optical system for correcting spherical aberration and a spherical aberration correcting optical system drive mechanism for driving the optical system. The optical pickup 6 further includes an objective lens, a focusing/tracking actuator, a converging lens, a light detector and so on so that a light beam is appropriately converged on the information recording layer 3 of the optical disk 1.

Referring to FIG. 1, the spherical aberration correcting mechanism drive circuit 11 drives the spherical aberration correcting optical system drive mechanism in the optical pickup 6 to realize an optimum spherical aberration correcting condition when the cover layer 4 of the optical disk 1 involves an error and/or when the recording layer actually includes two or more than two recording layers.

The focusing/tracking processing circuit 8 generates focusing error signal and/or tracking error signal by executing a predetermined arithmetic process according to the signal that is obtained from the light beam reflected from the information recording track 5 by photoelectric conversion.

The focusing/tracking drive circuit 10 drives the focusing/tracking actuator for focusing/tracking control so as to make the light spot appropriately follow the information recording track 5 according to the focusing error signal and/or tracking error signal.

The RF signal processing circuit 9 generates a reproduction information signal from the signal obtained from the light beam reflected from the information recording track 5 by photoelectric conversion. In this embodiment, the RF signal processing circuit 9 has a feature of gauging the reproduced signal amplitude. As general practice, the reproduced signal amplitude is gauged by sampling peak/bottom values by peak/bottom detection.

However, techniques for gauging the reproduced signal amplitude are not limited to the technique of the above-described method. A technique of sampling the reproduced signal at a predetermined cycle period, determining the standard deviation of the sampled values and multiplying the standard deviation by a predetermined factor to determine the reproduced signal amplitude is also available. For gauging the reproduced signal amplitude, a requirement that mark/non-mark of the recorded signal shows periodicity within a sufficiently small range relative to the sampling region or mark/non-mark shows randomness needs to be met. In other words, such a signal needs to be recorded. More specifically, a monotone signal, a random signal with a DSV (digital sum value) that is held sufficiently low may be used as such a recorded signal.

Additional description is further provided below. The reproduced signal is sampled for a predetermined number of samples by means of the channel clock of the recorded data row or a clock of integer times of the channel clock. If each sampled value is Xi and the number of samples is n, the standard deviation (StdV) of the sampled signal levels is determined by the formula shown below.

$$StdV = 1/n\{\Sigma Xi^2 - [(\Sigma Xi)^2]/n\}^{(1/2)} \qquad (3)$$

If a DC component is contained in the reproduced signal amplitude, the computation is accompanied by any problem because the average of the sampled values is subtracted as expressed in the formula (3) above.

With popular techniques of peak/bottom detection cited above, the reproduced signal amplitude follows peaks/bottoms when the reflectivity is abnormally large or small due to scars or dirt on the track. Additionally, since peak/bottom values converge to ordinary values with a time constant, the amplitude can be observed to be large in the region to make it impossible to accurately gauge the signal amplitude. Therefore, the greatest advantage of this method is to minimize the influence of any abnormality in the reflectivity within the gauging region due to scars, dirt and/or defects.

The controller 12 is a control circuit for controlling the components of the apparatus. More specifically, the controller 12 controls the revolutions per unit time of the optical disk 1 and the operation of turning on/off the semiconductor laser that is the light source in the optical pickup 6. Additionally, the controller 12 controls the power for each operation and each of the servo systems and adjusts the recording power as will be described in greater detail hereinafter. More specifically, when controlling/adjusting the recording power, the controller 12 controls the recording power of the test recording process, the sequence of the test recording process and the reproduced signal gauging process and adjusts the recording power to an optimum level.

Now, the recording power adjustment method by test recording according to the invention of an optical disk apparatus having the above-described configuration will be described below. As an optical disk 1 is put into the optical disk apparatus and set for operation, the optical disk 1 is driven to rotate at a constant linear velocity or with a constant number of revolutions per unit time by the spindle motor 7 under the control of the controller 12.

After completing a pre-process such as a single full turn of the optical disk 1 and/or turning on/off of the semiconductor laser, the controller 12 appropriately processes the obtained focusing signal by means of the focusing processing circuit 8 and subsequently controls the focus by drawing in the focus according to the obtained focusing error signal.

Thereafter, the controller 12 confirms the locked focus and processes the obtained tracking signal by means of the tracking processing circuit 8 and sequentially controls the tracking by drawing in the tracking according to the obtained tracking error signal.

Then, the controller 12 moves the optical pickup 6 into the lead-in area of the optical disk 1, reads out the various data recorded in the lead-in area from the optical disk 1 and stores the data in a memory (not illustrated). The data acquired in this stage includes ID information of the optical disk 1 and information necessary for defining the optimum recording power.

Figure 4:
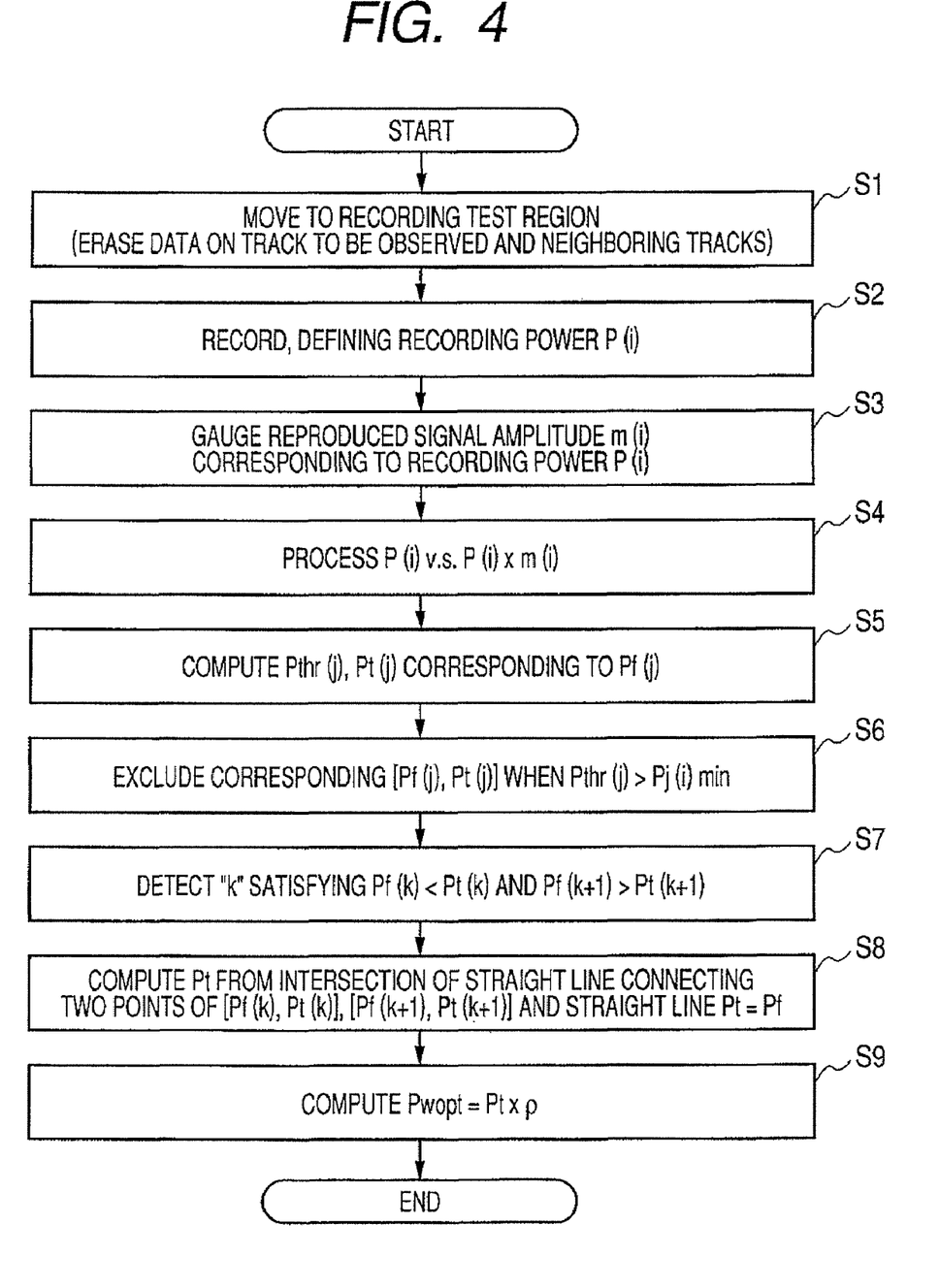
FIG. 4 is a flowchart of the first embodiment of recording power adjustment method according to the present invention.

Now, the optimum recording power adjustment method will be described by referring to the flowchart of FIG. 4. The adjustment operation is conducted under the control of the controller 12. As described above, the information recorded in the lead-in area of the optical disk is reproduced and acquired and subsequently, as the execution command from the host (not illustrated) for the optimum recording power process of test recording is input, the controller 12 moves the light spot of the optical pickup 6 to the recording test region of the optical disk 1.

At this time, in the case of a rewritable optical disk, the data on the two neighboring tracks at the opposite sides of the track for gauging, if any, is erased in view of the influence thereof to the operation of gauging the amplitude due to cross talks (S1). In the case of a write once medium, the two neighboring tracks of the recording test region are preferably in an unrecorded state.

Then, the recording power is defined according to the data acquired from the lead-in area. Additionally, for a test recording operation, the recording test region of the optical disk is divided into a plurality of divisional regions and a signal is recorded in the divisional regions with different recording power levels (S2). The recording pattern to be used for the test recording may be the same as the one described above for the conventional art.

Then, $P_{thr}(=P_{target}/\kappa)$ and the $P_{wopt}(=\rho \times P_{target})$ are computed from the center power information $P_{target}$ for test recording, the ratio $\kappa$ of $P_{target}$ to the recording threshold power, the ratio $\rho$ of the optimum recording power to $P_{target}$ that are obtained from the disk information. Thereafter, the range to be divided and the dividing pitch of the recording power are selected on the basis of the computed values to determine the row of P(i), or the recording power row for test recording. The recording test region is divided corresponding to the divided state of the recording power.

Assume here that the range to be divided of the recording power is from $P_{thr}$ to $P_{wopt}$ and divided into a plurality of sub-ranges to define the recording power row. However, the lower limit value of the low power side of the divided recording power may not be defined to be $P_{thr}$ as above. Normally, changes in the optical characteristics and changes in the recording power due to stains reduce the power of irradiation of a light beam. Therefore, the range of the low power side may well be determined by taking this fact into consideration.

Preferably, not less than five levels of recording power for test recording are found within the range of center power information $P_{target} \pm 10\%$. Differently stated, the levels of recording power are preferably differentiated by less than $(1.1 \times P_{target} - 0.9 \times P_{target})/5$ within the recording power range from $P_{target}/\kappa$ to $P_{target} \times \rho$. The above formula is used to define the recording power row P(i) for this embodiment.

The region to be used for test recording is preferably not greater than a full round track of the optical disk from the viewpoint of reducing the time to be spent for the test recording. Taking the abode described dividing condition into consideration, the divisor for dividing a full round track may be automatically determined. For example, a full round track may be divided by a divisor of 25.

Thus, the levels of recording power are defined as described above and the recording process of test recording is executed with the different levels of recording power. Subsequently, the recorded signals recorded in the recording test region of the optical disk is reproduced to observe the reproduced signal amplitudes m(i) that correspond to the recording power row P(i) (S3). The RF signal amplitude is gauged by the RF signal processing circuit 9 as described above.

While the amplitude gauging method is not particularly limited, the technique of gauging the amplitude by multiplying the standard deviation of the sampled amplitude values by a predetermined factor is used for this embodiment.

With this amplitude gauging technique, the reproduced signal is sampled by means of a sampling clock for gauging the amplitude. However, according to the study made by the inventor of the present invention in advance, it is not necessary for the sampling clock to be synchronized with the recorded signal.

The computation of the formula (3) is conducted while sampling the reproduced signal within a single divisional region by means of the clock and the standard deviation of the amplitude levels is computationally determined. When the signal to be observed is a sine wave, the amplitude is determined by multiplying by $2\sqrt{2}$ because the computed result is the effective value of the sine wave.

In the case of random signals, the computed value does not agree with the amplitude observed by peak/bottom detection because there are signals whose amplitude is reduced by inter-code interference. However, with the optical system, the line density and the random recording pattern that the inventor of the present invention used in an experiment, a value equivalent to the amplitude observed by peak/bottom detection is obtained by further multiplying by 1.5, or multiplying by $1.5 \times 2\sqrt{2}$.

The reproduced signal contains a noise component as a matter of course and hence the amplitude can be gauged only by means of the noise. Therefore, it is desirable to prepare a divisional region that is not used for recording and the result of amplitude observation in this region is subtracted from each of the observed values as offset value of each of the gauged amplitudes.

Thus, the reproduced signal amplitudes $m(i)$ that corresponds to the respective recording powers $P(i)$ are obtained by means of the above-described technique as illustrated in FIG. 10. The relation as illustrated in FIG. 11 is obtained by plotting the relations of $P(i) \times m(i)$ v.s. $P(i)$ from the obtained results (S4).

Additionally, the range of recording power (the range from $P_{thr}$ to $P_{wopt}$ in this instance) is divided at a pitch of 10% of the center power information $P_{target}$ for test recording and each center power is defined by $P_f(j)$. In other words, a plurality of recording powers are selected from the above-described recording power row $P(i)$ and the center powers thereof are defined by $P_f(j)$. The number of selected recording powers is preferably not less than three. This means that three or more than three center powers $P_f$ are selected from the range of recording power.

Subsequently, for instance, a row of recording power $P_j(i)$ is defined within the range of $\pm 10\%$ of each $P_f(j)$ or the range of $\pm 10\%$ of $P_{target}$ for the centers $P_f(j)$ and $m_j(i) \times P_j(i)$ is computed from the amplitude information $m_j(i)$ corresponding to the $P_j(i)$ (on the basis of the relation of $P(i)$ and $m(i)$ of S3). Additionally, the relation of the recording power row $P_j(i)$ and $m_j(i)$ that corresponds to the recording power row $P_j(i)$ is linearly approximated ($P_j(i)$ is indicated by the horizontal axis and $m_j(i) \times P_j(i)$ is indicated by the vertical axis).

While the center powers $P_f(j)$ are selected after defining the recording power row $P(i)$ in the above description, the recording power row $P(i)$ may alternatively be selected after defining the center powers $P_f(j)$ in such a way that the defined ranges of recording power that are centered respectively at the center powers $P_f(j)$ are located within the overall range of recording power (the range from $P_{thr}$ to $P_{wopt}$ in this instance).

Figure 5:
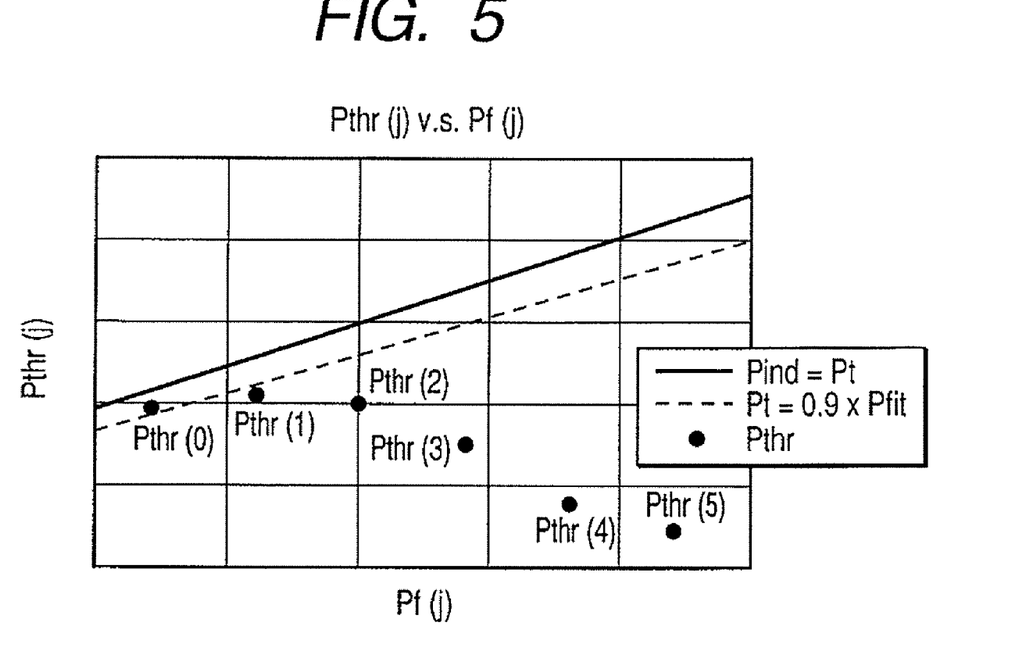
FIG. 5 is a graph illustrating the relationship of the intersection $P_{thr}(j)$ of the linear approximation straight line and the recording power axis relative to the center power $P_f(j)$ of each divisional region.
Figure 6:
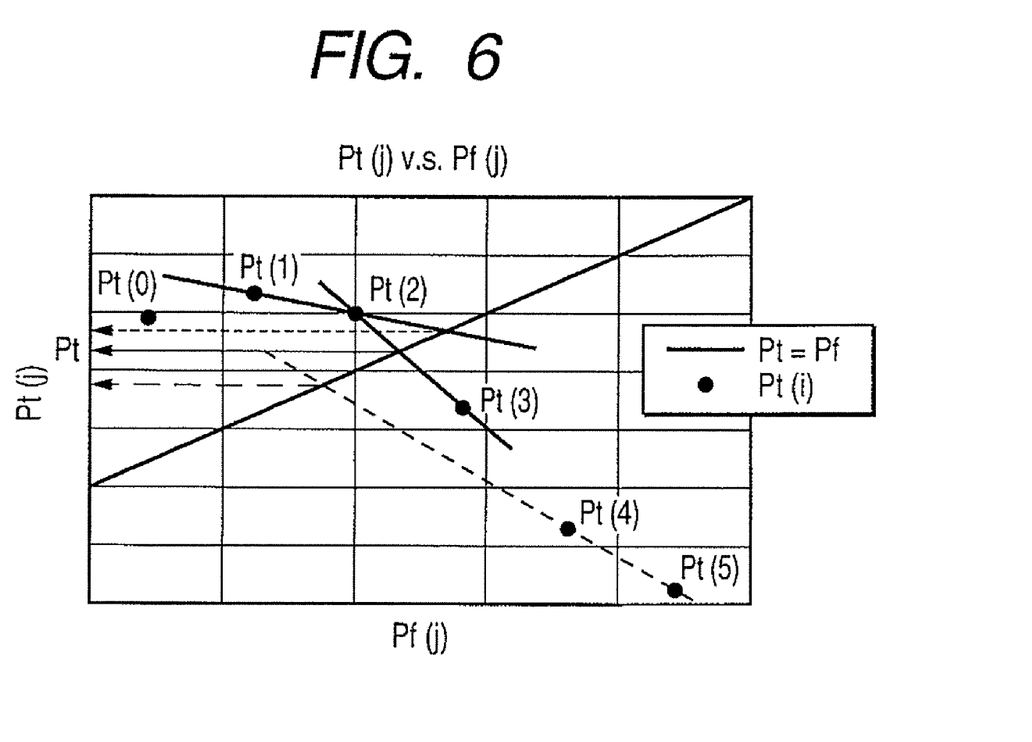
FIG. 6 is a graph illustrating the relationship between $P_t(j)$ and $P_r(j)$.

Thereafter, the intersection of the straight line of the linear approximation and the recording power axis is determined as $P_{thr}(j)$. In this way, the relation of $P_{thr}(j)$ is obtained for each $P_f(j)$ as shown in FIG. 5. Additionally, the relations as shown in FIG. 6 are obtained by determining $P_t(j)$ by multiplying $P_{thr}(j)$ by $\kappa$ (S5).

If the relationship of $P_{thr}(i) > P_j \min$ holds true for the minimum value $P_j \min$ of $P_j(i)$ used for computing $P_{thr}(j)$ and $P_{thr}(j)$, the value of $P_{thr}(j)$ will be excluded from the subsequent data processing operations.

In other words, when the computed value of $P_{thr}(j)$ is larger than the lower limit of the power range used for the computation, the amplitude data of the power range used for the computation may contain amplitude information on the recording power that is too low to record a signal. Then, the linearity of the linear approximation used for computing $P_{thr}(j)$ may become a problem.

For this reason, the value of $P_{thr}(j)$ is excluded from the subsequent data processing operations to realize an accurate OPC process. For example, by seeing the computed $P_{thr}(j)$ in FIG. 5, it will be found that the value of $P_{thr}(0)$ is higher than $0.9 \times P_f(0)$ (the straight line indicated by the broken line in FIG. 5 is the line of $0.9 \times P_f(j)$).

In other words, $P_{thr}$ that is higher than the lower limit value, which is $-10\%$ of the range of recording power used for computing $P_{thr}(0)$, is detected and satisfies the above-described requirement of exclusion. Therefore, the point $P_t(0)$ in FIG. 6 satisfies the above requirement and hence is excluded from the subsequent data processing operations (S6).

Thereafter, "k" that satisfies the requirement of $P_f(k) < P_t(k)$ and the requirement of $P_f(k+1) > P_t(k+1)$ is detected for the computed ($P_f(j)$, $P_t(j)$). As a result of this process, the two points at the opposite sides of $P_t = P_f$ are detected (S7).

The meaning of the straight line $P_t = P_f$ will be described here. The medium information that relates to OPC and described in the disk information is the information obtained by the manufacturer of the medium as a result of a gauging operation. The manufacturer of the medium may have used an evaluation tester, observed the amplitude dependency within a range of power extending to the opposite sides of the recording power $P_{target}$ and determined $P_{thr}$ that is the intercept of the recording power axis by linear approximation of $P \times m$ v.s. $P$ as described above. The ratio of $P_t$ to $P_{thr}$ ($P_t / P_{thr}$) is expressed by $\kappa$.

Note that $P$ v.s. $P \times m$ normally does not form a complete straight line and shows a relation that depends on the center value of the recording power that is linearly approximated and provides a different intercept with the inclination/power axis. Differently stated, if the optical disk apparatus that uses this optical disk operates for gauging/processing, using a recording power having the same significance as $P_{target}$ in terms of amplitude changing characteristics, and determines $P_{thr}$, $P_t'$ that is determined by multiplying by $\kappa$ agrees with the center power $P_{target}$ for test recording.

Conversely, if the optical disk apparatus operates for gauging/process, using a recording power having a significance different from $P_{target}$ and determines $P_{thr}$, $P_t'$ that is determined by multiplying by $\kappa$ does not agree with the center power $P_{target}$ for test recording.

As an example, the observed point of $P_t(5)$ is clearly deviated from the relation of $P_t = P_f$ in FIG. 6.

A technique of utilizing the intersection of the linear approximation straight line formed by observing two points for $P_f$ and the relation of $P_t = P_f$ may be conceived to correct the detection error of each of such points. If such is the case, it will be seen that the instance where two points that are not found at the opposite sides of the straight line of $P_t = P_f$ such as ($P_t(1)$, $P_t(2)$) and ($P_t(4)$, $P_t(5)$) are used differs from the instance where two points that are found at the opposite sides of the straight line of $P_t=P_f$ such as $(P_t(2), P_t(3))$ are used, in the position of intersection.

Therefore, it is possible to realize a highly accurate OPC operation by detecting two points that are found at the opposite sides of the straight line of $P_t=P_f$ ($P_t(2)$ and $P_t(3)$ in FIG. 6) and determining the intersection of the straight line connecting the two points and the straight line of $P_t=P_f$ (S8). In FIG. 6, the intersection of the straight line connecting $P_t(2)$ and $P_t(3)$ and the straight line of $P_t=P_f$ is indicated by $P_t$.

Finally, the recording power $P_{wopt}$ is determined by multiplying the ultimately obtained $P_t$ by $\rho$ that is read out from the DI information (S9).

The controller 12 of the optical disk apparatus defines the $P_{wopt}$ and employs the $P_{wopt}$ for the subsequent operation of recording information. There may be an optical disk apparatus that further and minutely adjusts the recording power on the basis of the detected $P_{wopt}$.

Second Embodiment

Figure 7:
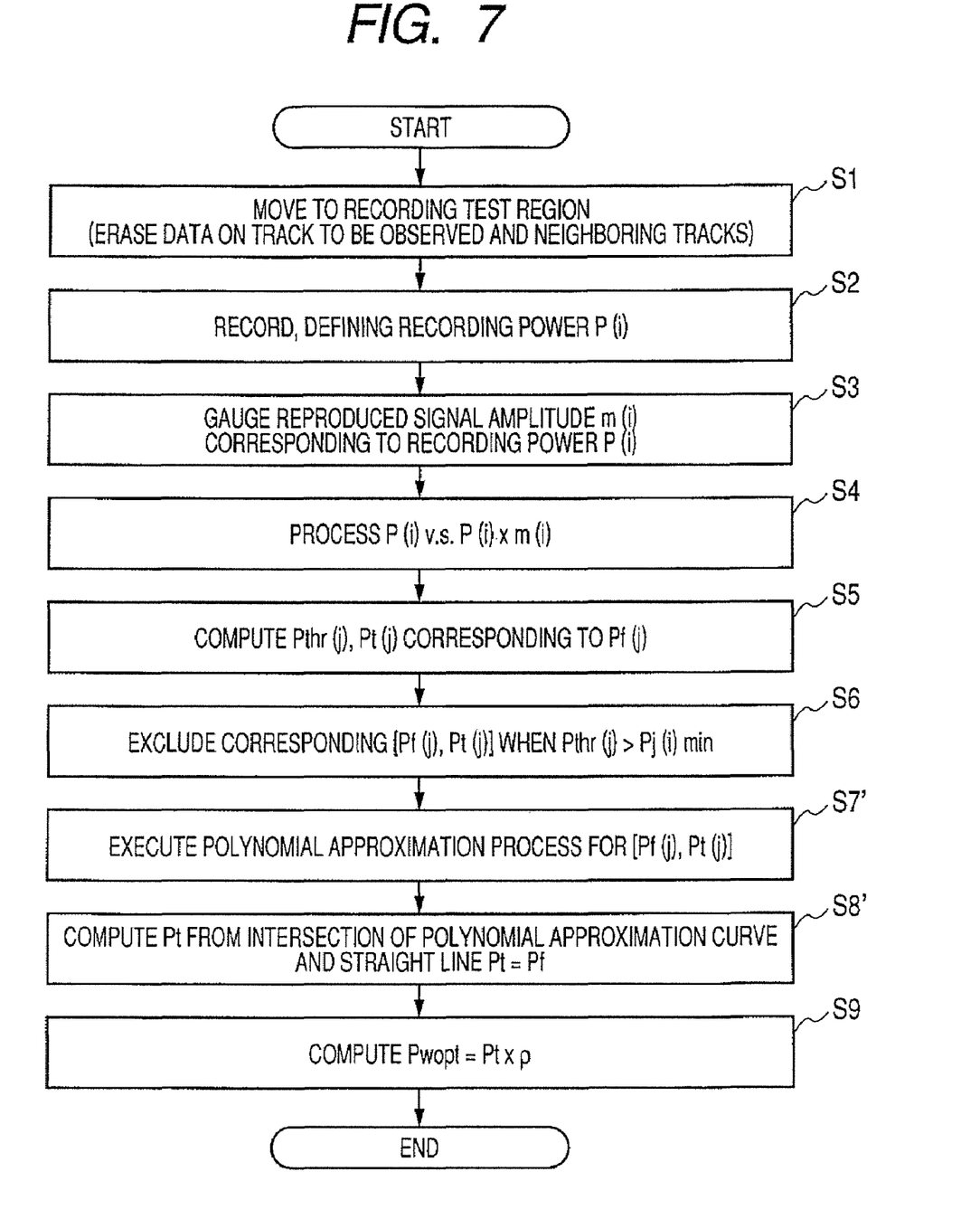
FIG. 7 is a flowchart of the second embodiment of recording power adjustment method according to the present invention.

The above-described first embodiment is configured to compute $P_{wopt}$ by detecting two points located at the opposite sides of the straight line of $P_t=P_f$ and determining the intersection of the straight line connecting the two points and the straight line of $P_t=P_f$. FIG. 7 is a flowchart of the process of the embodiment adapted to employ polynomial approximation of $P_t(i)$ v.s. $P_f(i)$ as a technique of determining the intersection with the straight line of $P_t=P_f$. Otherwise (i.e. except for S7' and S8'), this process is the same as the process of FIG. 4.

Figure 8:
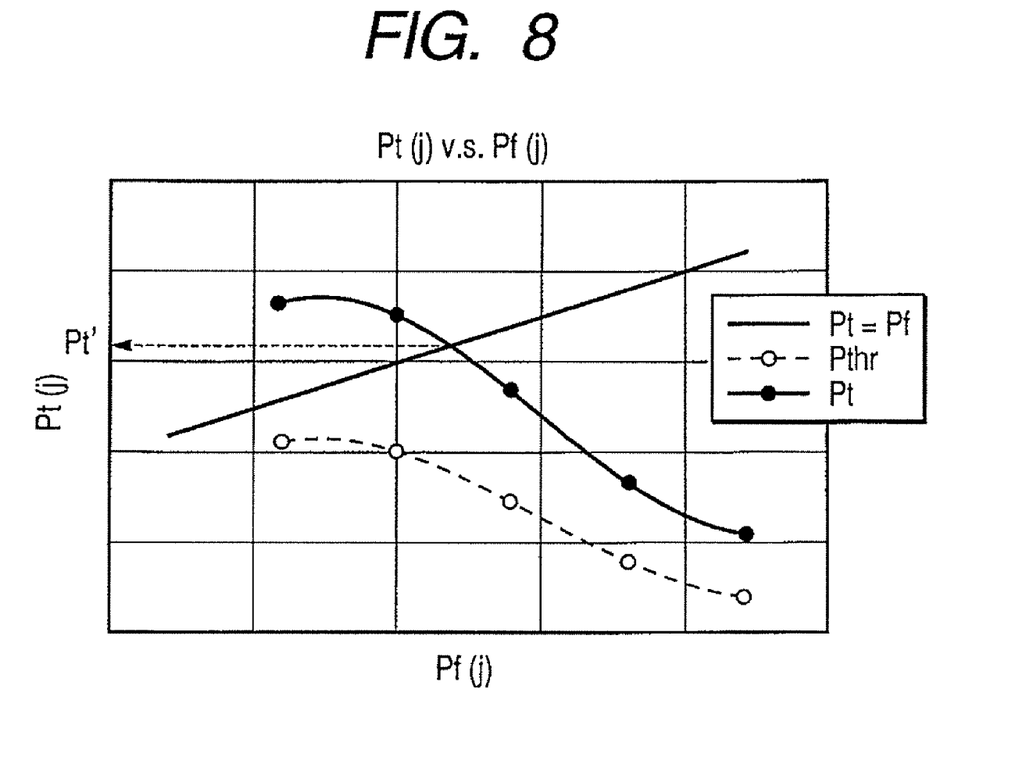
FIG. 8 is a graph illustrating an example of polynomial approximation of the relationship of $P_t$ and $P_f$ of the second embodiment.

FIG. 8 illustrates approximation curves obtained by cubic approximation of the relation of $P_t(i)$ and $P_f(i)$.

As shown in FIG. 7, the recording power $P_t'$ is obtained by executing a polynomial approximation process on the $P_t(i)$ row excluded in S6 (S7') and determining the intersection with the relation of $P_t=P_f$ (S8'). With this arrangement, it is possible to compute $P_{wopt}$ with an accuracy level similar to the above-described method. The process flow of FIG. 7 is the same as the process flow of FIG. 4 except the use of polynomial approximation and hence will not be described here any further.

Thus, according to the present invention, it is possible for a method of adjusting the optimum recording power (OPC) by test recording to execute a highly accurate OPC process by conducting a test recording operation only once without repeating a test recording operation depending on the outcome thereof. Then, as a result, it is possible to reduce the adjustment time required at the time of putting an optical disk into an optical disk apparatus and at the time of starting an optical disk apparatus so as to make the optical disk apparatus comfortable for users.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-189, filed Jul. 10, 2006, which is hereby incorporated by reference herein in its entirety.

What is claimed is:

1. A recording power adjustment method for recording information on an optical disk comprising the steps of:
    selecting at least three testing center recording powers $P_f(j$: $j>3$) according to disk information written on the optical disk in advance;
    recording a signal in a recording test region of the optical disk, with a recording power being shifted according to a testing recording power row $P_j(i)$ defined around each of the testing center recording powers $P_f(j)$;
    reproducing the signal recorded in the recording test region and detecting a reproduced signal amplitude row $m_j(i)$ corresponding to the recording power row $P_j(i)$, for each of the testing center recording powers;
    linearly approximating a relationship between the recording power row $P_j(i)$ and a row of multiplication products of corresponding values of the reproduced signal amplitude row $m_j(i)$ and the recording power row $P_j(i)$ and computationally determining a recording threshold power $P_{thr}(j)$ as an intersection of the linear approximation straight line and the recording power axis, for each of the testing center recording powers;
    computationally determining a tentative reference recording power $P_t(j)$ as a multiplication product of the recording threshold power $P_{thr}(j)$ and a first factor K contained in the disk information, for each of the testing center recording powers;
    computationally determining a definitive reference recording power $P_t'$ as an intersection of a straight line or curve connecting two points of $(P_f(j), P_t(j))$ and a straight line representing $P_t=P_f$ in a graph in which the computationally determined at least three tentative reference recording powers $P_t(j)$ are plotted relative to the corresponding at least three testing center recording powers $P_f(j)$, the two points being selected such that the two points are located at the opposite sides of the straight line representing $P_t=P_f$; and
    computationally determining an optimum recording power $P_{wopt}$ to be used for recording on the optical disk by multiplying the definitive reference recording power $P_t'$ by a second factor $\rho$ contained in the disk information;
    wherein, when the recording threshold power $P_{thr}(j)$ is greater than the smallest value of the corresponding recording power row $P_j(i)$, $P_t(j)$ corresponding to the recording power row $P_j(i)$ is excluded.

2. A recording power adjustment method for recording information on an optical disk comprising the steps of:
    selecting at least three testing center recording powers $P_f(j$: $j>3$) according to disk information written on the optical disk in advance;
    recording a signal in a recording test region of the optical disk, with a recording power being shifted according to a testing recording power row $P_j(i)$ defined around each of the testing center recording powers $P_f(j)$;
    reproducing the signal recorded in the recording test region and detecting a reproduced signal amplitude row $m_j(i)$ corresponding to the recording power row $P_j(i)$, for each of the testing center recording powers:
    linearly approximating a relationship between the recording power row $P_j(i)$ and a row of multiplication products of corresponding values of the reproduced signal amplitude row $m_j(i)$ and the recording power row $P_j(i)$ and computationally determining a recording threshold power $P_{thr}(j)$ as an intersection of the linear approximation straight line and the recording power axis, for each of the testing center recording powers;
    computationally determining a tentative reference recording power $P_t(j)$ as a multiplication product of the recording threshold power $P_{thr}(j)$ and a first factor κ contained in the disk information, for each of the testing center recording powers;
    computationally determining a definitive reference recording power $P_t'$ as an intersection of a straight line or curve connecting two points of $(P_f(j), P_t(j))$ and a straight line representing $P_t = P_f$ in a graph in which the computationally determined at least three tentative reference recording powers $P_t(j)$ are plotted relative to the corresponding at least three testing center recording powers $P_f(j)$, the two points being selected such that the two points are located at the opposite sides of the straight line representing $P_t = P_f$; and computationally determining an optimum recording power $P_{wopt}$ to be used for recording on the optical disk by multiplying the definitive reference recording power $P_t'$ by a second factor $\rho$ contained in the disk information; and wherein the reproduced signal amplitude is computationally determined according to the standard deviation of a group of sampled data obtained by sampling the reproduced signal by means of a clock of an integer times of a cycle of a channel clock synchronously or asynchronously.

* * * * *